May 2, 1933. W. J. WILLIAMS 1,907,167
MECHANISM FOR DETERMINING DEVIATION OF WELLS FROM THE PERPENDICULAR
Filed May 20, 1929. 2 Sheets-Sheet 1
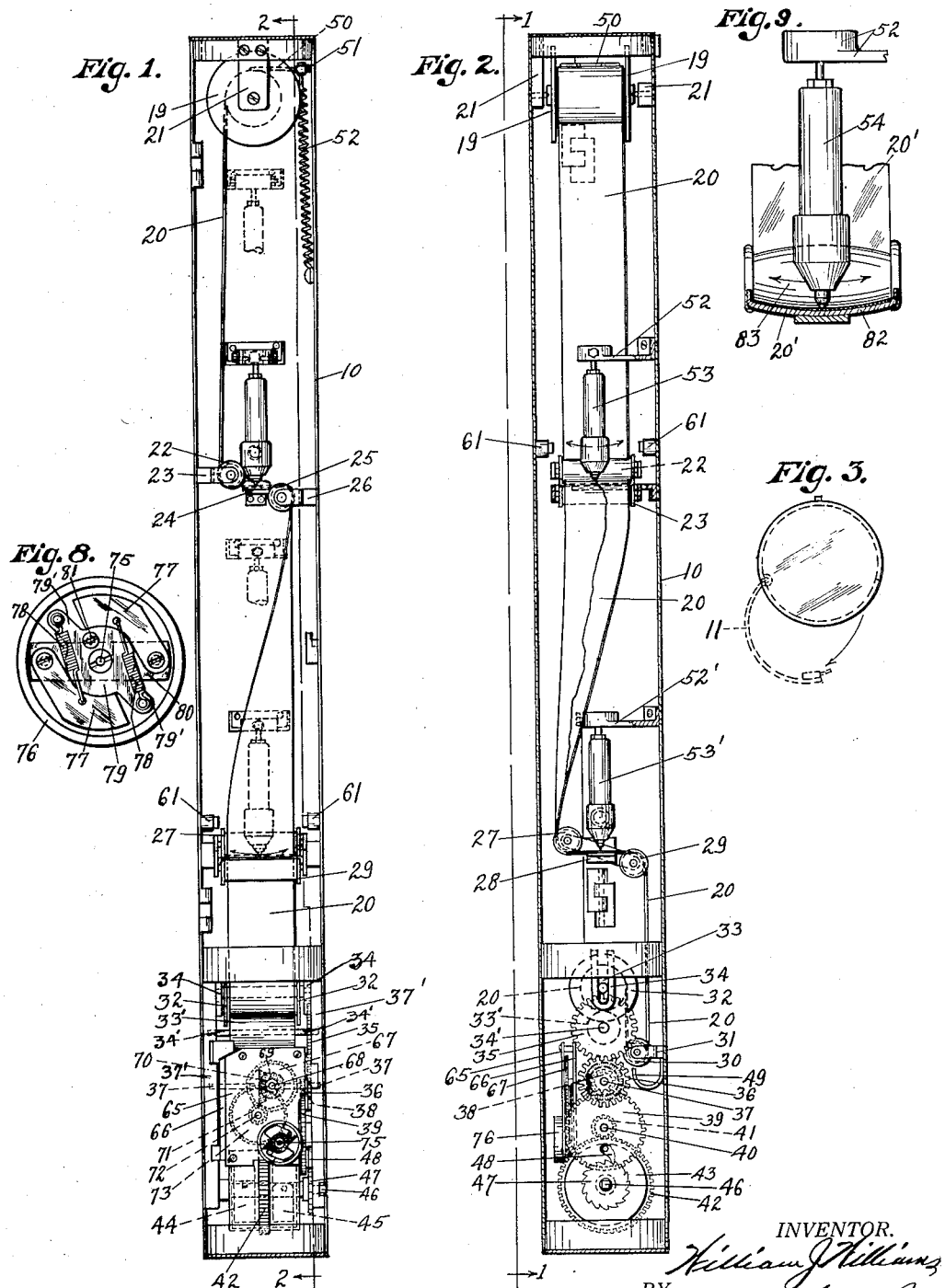

May 2, 1933. W. J. WILLIAMS 1,907,167
MECHANISM FOR DETERMINING DEVIATION OF WELLS FROM THE PERPENDICULAR
Filed May 20, 1929 2 Sheets-Sheet 2
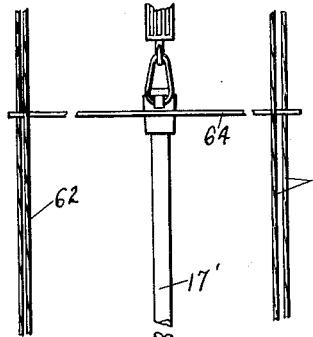
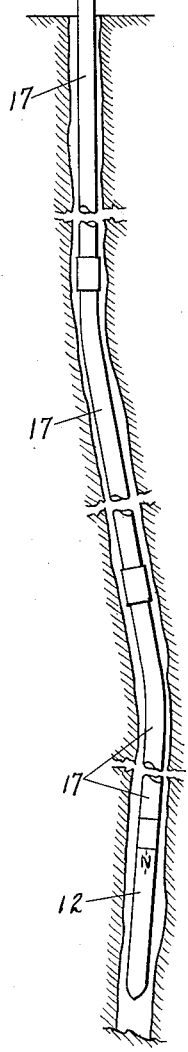
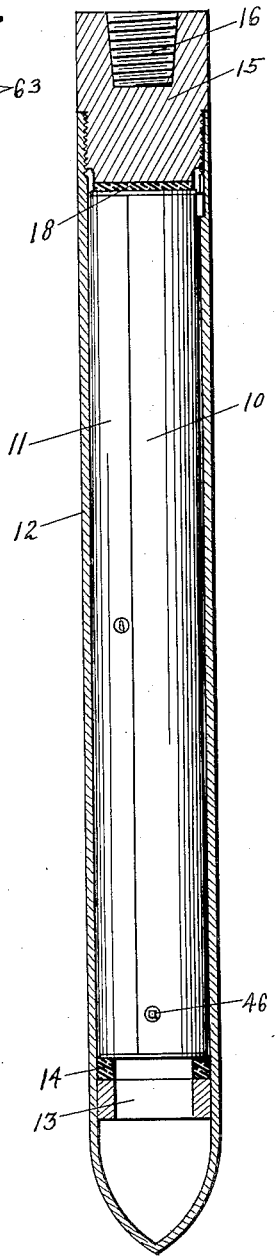
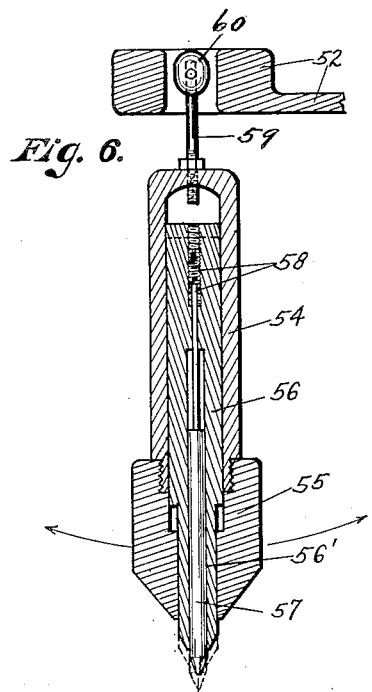
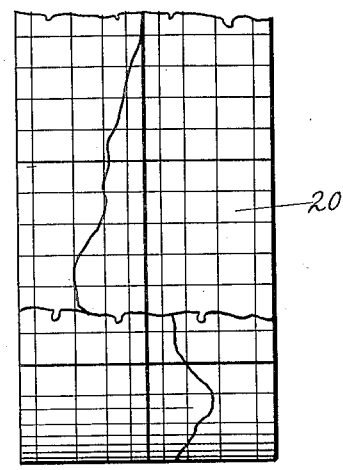
INVENTOR.
William J. Williams
BY
ATTORNEYS.

Patented May 2, 1933

1,907,167

UNITED STATES PATENT OFFICE

WILLIAM J. WILLIAMS, OF SOUTH GATE, CALIFORNIA, ASSIGNOR OF ONE-HALF TO L. A. WAGNER, OF LOS ANGELES, CALIFORNIA

MECHANISM FOR DETERMINING DEVIATION OF WELLS FROM THE PERPENDICULAR

Application filed May 20, 1929. Serial No. 364,354.

My invention relates to mechanism for determining deviation of wells from the perpendicular, and more particularly to a mechanism which can be lowered into a well and which will, as it descends into said well, automatically make a record or graph of the direction of the well into the earth.

Among the salient objects of my invention are: to provide a device which is self-contained and which can be lowered into a well and which will automatically make a record on a moving strip of material, associated therewith, which record indicates any deviation from the vertical; to provide in a device of the character referred to means for holding and moving a tape of material in combination with pendulum marking means adapted to mark upon said tape the various deviations from the perpendicular as said device moves down into a well; to provide in a device of the character referred to means for moving said tape of material from one roll to another with a constant, uniform and controlled manner, whereby it is possible to correlate the movement of the device into a well with the speed of movement of the tape under the marking means; to provide a pendulum marking means which automatically shortens and lengthens as the pendulum moves upon its pivotal bearing, whereby to maintain marking contact with the tape; to provide a device of the character referred to with a single tape of material, and with a plurality of pendulum marking devices mounted to swing at different angles and to mark upon the opposite sides of the tape any deviations which cause said marking devices to move and register upon the tape the movements as made; to provide in combination with a tape means for moving it from one roll to another at a uniform and automatically maintained speed of movement, regardless of the increasing size of one roll as the tape accumulates thereupon and the diminishing size of the other roll as the tape leaves it; to provide means for controlling the turning of the feeding roll which will be uniform as the roll diminishes in size; and, in general, to provide a practical, simple and comparatively economical device which will automatically make a record of the deviations of a well from the true perpendicular as said device is lowered into said well.

In order to fully explain my invention I have illustrated on the accompanying two sheets of drawings, one practical embodiment of my invention, which I will now describe.

Figure 1 is a side view of a device embodying my invention, with the door removed, and looking into the inside of the housing, being from the side indicated by the line 1—1 on Fig. 2;

Figure 2 is a longitudinal sectional view therethrough, taken on line 2—2 of Fig. 1;

Figure 3 is a top end view of the housing, with door indicated open in light broken lines;

Figure 4 is a view illustrating a well of irregular direction, showing my device encased at the lower end of the tube being let down into the well;

Figure 5 is a longitudinal sectional view of a casing into which my device is placed and which is then connected to the lower end of a drill pipe or tube by which it is lowered into the well;

Figure 6 is a longitudinal sectional view through a pendulum marking means; and

Figure 7 is a fragmentary piece of tape for receiving the record or graph to be made thereon by the pendulum marking means;

Figure 8 is an enlarged face view of the governor; and

Figure 9 is a modification of the guide roll and support for the paper.

Referring now in detail to the drawings, Figs. 1 and 2, my invention as here shown for descriptive purposes, comprises a tubular housing designated 10, provided with a hinged door 11, indicated in light broken lines, partially open in Fig. 3, whereby when said door is closed, said housing is closed tight. It is also closed at both ends. This housing is placed in a casing, Fig. 5, having a pointed lower end and designated as a whole 12, with a supporting annular member 13, at its lower end, with cushion 14 thereupon, and at its upper end said casing is provided with a closure head, 15, provided with a threaded socket 16, to receive the threaded end of a drill pipe, 17, by means of which it can be lowered into a well to any desired depth, section by section. A cushion member 18 is placed between the upper end of the instrument housing 10, and said head 15, as indicated in said Fig. 5, in which said housing is shown in place.

Referring back to Figs. 1 and 2, a roll or spool 19, for tape 20, is suitably supported in the upper end of the housing 10, by brackets, 21, 21, said tape extending down to and around a roller 22, on a bracket 23, and thence across the center of said housing, over the top of a supporting plate 24, therefor, and over a roller 25, supported at the opposite side of said housing upon a bracket 26. Said tape 20 is then carried down under a roller 27, at a lower position in said housing 10, thence over a second supporting plate 28, and over another roller 29, and thence downwardly and around a roller 30, supported in the side of the housing by a bracket 31. Said tape is thence carried upwardly and winds upon a second spool 32, having its axle or trunnions mounted in vertical bearing slots, as 33, in two supporting members 34, 34, whereby said spool can revolve and also be raised and lowered in said bearing slots. It will be seen that the tape 20, as it leaves the upper roller 25 and passes down to the lower roller 27 is reversed so that its opposite side is uppermost on the supporting plate 28.

I have shown a novel method of moving the tape which I will now describe. The receiving spool 32, being vertically movable, as above referred to, rests by gravity with the roll of tape bearing upon a friction driving roller 33', whose spindle 34', is provided with a drive gear 35, in mesh with a gear 36, on the end of a spindle 37, extended across the housing with bearings at its opposite ends in two bearing members, 37' and 37', mounted on the inner sides of the housing. On said spindle 37, just inside of the gear 36, is a smaller gear 38, in mesh with a larger gear 39, on a shaft 40, through said housing 10, said shaft 40 having a pinion 41 near its middle, which meshes with a gear ring 42, in the middle of a drum 43, said drum 43 being provided on its interior with two power or driving springs 44, 45, connected at one end to the shaft 46 of said drum, with the other ends of said springs connected to the inside of said drum, in the usual manner. Ratchet wheel 47 is shown on the drum shaft, 46, with pawl 48, cooperating therewith, the outer end of the shaft 46 being adapted to receive a winding key, through the side of the housing 10, as clearly indicated.

Thus the spring driven gear ring 42, on the drum 43, through the gear train which includes gears 41, 39, on shaft 40, 38, 36, on shaft 37, and gear 35, drives the feed or friction feed roller 33, upon which the receiving roll of tape or paper rides. This gives me a novel and highly useful feed feature which remains constant and uniform regardless of the increasing size of the roll as the tape or paper is wound upon it. The feed is accomplished by the friction bearing of this roller 33' upon the roll of paper and the roll of paper rests by gravity in driving engagement with said roller. In order to facilitate the feeding of the end of the paper around the roller 30, I provide an upturned guide plate 49 in the housing, as seen in Fig. 2, which operates to turn the end of the paper upwardly as it is pushed down past the roller 30.

The upper spool 19, containing the roll of tape 20, is frictionally held against loose turning by means of a wire yoke 50, pivotally mounted to the side of the housing, as at 51, with a long, light coiled spring 52, attached thereto near its pivot connection and at its lower end secured to the inside of the housing. This gives a yielding pull downwardly on the wire yoke at a point near its pivotal support, while its free end bears upon the roll of paper, substantially in the manner indicated. The point of connection of the upper end of the spring 52 to the spring yoke can be varied, as may be desired by sliding it outwardly or inwardly toward the pivot connection.

I will now describe the swinging marking devices which make the record or graph upon the tape 20. A supporting bracket 52 is mounted in the housing above the rollers 22 and 23, and in this is pivotally suspended a swinging member or pendulum 53, shown in enlarged sectional view in Fig. 6. Said marking member comprises an outer tubular member 54, having a head 55 screwed upon its lower end, with a telescoping member 56 therein with a reduced lower end 56' projecting through the tapering end of the head 55, and adapted to move freely in and out within certain limits, as will be understood from the showing made. As marking means, I have shown a lead 57 in said member 56, adapted to be adjusted outwardly by means of a small screw and rod at 58. The member 56, carrying the lead 57 is free to move inwardly and outwardly through the head 55, in order that the lead keep in marking contact with the paper during all swinging movements of said swinging pendulum or member 53. The weight of the said member 56 and the lead is such that this will be the case and the lead will mark at all times whenever it moves relative to the paper upon which it rests by gravity. The weight of the swinging member is such that it will not be held by the friction between the pencil or lead and the paper. The upper end of the member 54 is provided with a suspending screw 59, adjustable in said member, as indicated, while the upper end of the screw is connected to a ball or head 60, pivotally held in the bracket 52 so as to swing freely back and forth in one direction.

At a distance below, a second bracket 52' is mounted in said casing, and a second swinging marking device 53', which is the same as the upper one, except that the lower one is mounted to swing at right angles to the direction of the upper one. The reason for this will be obvious. The two swinging marking members, it will be seen, not only swing at right angles to each other, but engage and mark the opposite sides of the tape or paper 20, making the mark or graph as the paper is moved constantly under the markers and over the supporting tables or plates 24 and 28. Bumpers, as 61, 61, are provided in the housing to take any swinging contact of the members 53.

In Fig. 4, I have shown a string of drill pipe with my invention attached thereto and being let down into a well. It will be seen that the casing 12, at the lower end is marked N. This indicates that that side of the casing is toward the north. The other directions can be indicated likewise around the four sides of the casing. At the upper end of the drawings, I have illustrated two pairs of wires or cables, designated 62 and 63. A cross bar 64 is attached to the upper section of drill tube 17', to move with the drill tube as it is let down into the well. The cables 62 and 63 are connected to the upper end of a tower and to the platform or lower level and serve as a guide for the cross bar 64. It will be seen that any tendency of the drill case to turn will be indicated and the workmen can keep it in the starting position so as to maintain the instrument always substantially positioned according to the compass directions. Any slight twisting will not materially effect the operation of the instrument.

It will be understood, of course, that any number of marking devices can be used, and also that the length of the swinging members can be varied to get the best results. It will also be understood that I do not limit my invention to the particular use to which I have shown it put in these drawings, as it has many other uses for automatically marking or making a graph of deviation from a given direction of movement. Nor do I limit my novel means for constantly and uniformly feeding a roll of paper by frictional drive of a roller against the accumulating roll, whereby the paper is rolled snugly upon the roll and the driving speed is always the same, regardless of the size of the roll. This is important, as there is no variation in the feed of the paper, no matter how full the spool 32 may be.

The capacity of the motor springs in the drum 43 is four and a half hours in the device as actually constructed and the feed of the paper can be regulated by the adjustment of the governor mechanism, which I will now describe.

Mounted on the gear train, as here embodied for explanatory purposes, are two bearing plates, 65 and 66, between which are mounted a gear train including a gear 67, on a spindle 68, having on its inner end a small beveled gear 69, in mesh with a beveled gear 70 on the shaft 37 of the main train of gears. This connection drives the gear 67 from the main drive motor drum. Said gear 67 meshes with a pinion 71, on spindle 72, on which is a large gear 73, in mesh with a small pinion 74, on spindle 75, which is extended out through the bearing plate 65 into an annular flange or cup-like member on the outer face of said bearing or face plate. Mounted to revolve in said annular flange or cup-like member, which is designated 76, are two governor members each comprising a pivoted member 77, having its outer or free end in the form of a shoe to fit and conform to the inner circular form of said annular flange, something like a brake shoe, said members each being normally and yieldingly held inwardly by means of a light coiled spring 78, attached at one end to the governor member and at its other end to an anchor member 79 for said governor members. When said governor shoe members attain a certain speed they engage with the inside of the annular flange or cup, which operates to brake or check the revolution thereof and thus the speed is controlled. The tension of the springs can be changed by changing positions of adjustment and so the speed regulated. The anchor member 79 has two arms, as 79' and is mounted upon a cross member 80, attached to the shaft or spindle 75 to turn therewith. Said anchor member 79 and said cross member 80, are secured together on said shaft 75, to turn therewith and can be adjusted relative to each other by means of a little set screw 81. The anchor member 79 also serves as limit means for the inward movement of the governor members 77, 77.

In Fig. 9, I have shown a slight modification, wherein the supporting means for the tape 20, under each pendulum swinging device can be made curved with the same radius as the swinging member and the guide roller can also be made to conform thereto. In this figure, said modified supporting means is designated 82, the roller 83, and the tape or paper is indicated 20'. This makes it unnecessary for the marking element in the end of the swinging device 54 to be telescopically movable for the reason that the paper or tape is guided into a curved form conforming to the curvature of the supporting means across which it moves, and the curvature of which is the same as that of the swinging marking element.

The paper or tape 20, may be prepared with cross rulings, as indicated in Fig. 7, whereby the spacing can be used to indicate predetermined distances, depending upon the speed of travel of the tape and each space will correspond to a certain distance of travel of the device bodily, that is, the movement of the receiving tape is correlated to the movement of the device which carries the instrument. If it be a well tube the speed at which the tube or drill pipe is let down into the well will be correlated with the speed of travel for which the tape is set. If the instrument should be embodied in a form to move normally horizontally and for indicating deviation from the horizontal, the movement of the tape would be related to the speed of travel horizontally.

While I have shown my invention embodied in one practical form and for one designated use, I am aware that it can be changed in many details of construction and arrangement without departing from the spirit of the invention, and I am aware that it is susceptible to other uses than in determining the deviation from the perpendicular, and therefore I do not limit the invention to the details shown and described, except as I may be limited by the hereto appended claim.

I claim:

An instrument for determining the deviation of wells from the perpendicular including a tubular member closed at both ends and having a tape holding and delivering spool supported in the upper end of said tubular member, a tape receiving spool supported at the lower end of said tubular member, two sets of guide rollers interposed in said tubular member, one above the other and at right angles to each other for guiding and reversing said tape as it moves from one spool to the other, two pendulum marking devices supported to swing at right angles to each other at said guide rollers, respectively, whereby to mark on the reverse sides of said tape as it moves over said guide rollers and crosswise of said tubular member, and power mechanism for driving said tape receiving spool, said driving mechanism including a driven friction roller upon which said tape receiving spool rests by gravity, whereby the speed of said tape receiving spool is constant regardless of the accumulation of tape thereupon.

Signed at Los Angeles, Los Angeles County, California, this 15th day of May, 1929.

WILLIAM J. WILLIAMS.